UNITED STATES PATENT OFFICE 2,587,636

METHOD OF MAKING ALKALI METAL SALTS OF ORGANOSILOXANOLS AND ORGANO-SILANETRIOLS

Clinton W. MacMullen, Fayetteville, N. Y., assignor to Cowles Chemical Company, Cleveland, Ohio, a corporation of Ohio No Drawing. Application December 31, 1948, Serial No. 68,750

7 Claims. (Cl. 260—448.2)

This invention relates to organosilicon compounds and compositions containing the same. More particularly the invention relates to a novel class of compounds comprising salts, particularly water-soluble metal salts, of organosilanetriols, mono-organosiloxanols and mixtures of these compounds. The term "mono-organo" is used in the present specification and claims to designate organosilicon compounds wherein each silicon atom has a single organic substituent thereon.

This application is a continuation-in-part of my prior application Serial No. 782,683, filed October 28, 1947, now abandoned. The claims of the present application are directed to compounds and compositions wherein the organo substituent is selected from the group consisting of aryl, alkaryl, aralkyl and alkylaralkyl radicals.

In recent years there has been considerable interest in a class of organosilicon compounds known as silicones or silicone polymers. The silicones have been made and used in both liquid and solid form and exhibit many interesting properties, such as unusual stability and resistance to heat and corrosion. They have also been used in certain processes for rendering various materials water-repellent. I have now discovered another class or organosilicon compounds which possess a number of interesting and useful properties quite different from the properties of the silicones and which are readily convertible into silicones and may, as indicated hereafter, be used with advantage as silicone-forming compositions. More particularly I have found that metal salts of organosilanetriols, mono-organosiloxanols, and mixtures thereof may be prepared in aqueous solution and when properly so prepared they reduce markedly the surface tension of the solution, enhance its wetting properties, and confer detergent properties on the solution. Moreover these solutions, when acidified or diluted with water and preferably heated, produce silicone polymers and hence they may be used as silicone-forming compositions in cases where it may be desirable to deposit silicones in situ in relatively inaccessible locations. For example, the solutions of the present invention, because of their low surface tension and wetting properties, easily wet and penetrate the fibers of a fabric and when the fabric has been thoroughly wetted with such a solution it may be acidified to precipitate a silicone polymer on the surfaces and in the capillaries of the fibers of the fabric, thus producing a durable, resistant and water-repellent protective coating on the fibers.

The compounds of the present invention include both the organosilanetriols and the mono-organosiloxanols and may be represented by the following general formula which is generic to these two groups of compounds:

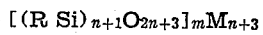

In this formula R is an organic substituent selected from the group consisting of aryl, alkaryl, aralkyl, and alkylaralkyl radicals, $n$ is selected from zero and the positive integers, M is a metal or strong organic base and $m$ is an integer representing the valence of M. In cases where a water-soluble product is desired M is preferably an alkali metal or it may also be a quaternary ammonium radical. In such a case the above formula may be written:

It will be recognized that there are two principal groups of compounds comprehended within this general formula, which groups may be called respectively mono-organosilanetriolates and mono-organosiloxanolates and which may be represented by the following general formulae wherein M is monovalent:

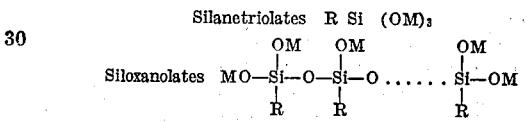

The silanetriolates may be considered monomers and the siloxanolates polymers. The siloxanolates may exist as linear, cyclic or cross-linked polymers and mixtures of such polymers.

The compounds of the present invention may be prepared by a variety of methods, several of which are described hereafter. In many cases it is convenient to prepare the compounds in aqueous solution both because they are customarily used in aqueous solution and because they are stabilized against hydrolysis and condensation by the presence of alkali. As indicated hereafter the compounds may also be prepared as dry solids. In accordance with a preferred method, the present compounds are prepared by hydrolyzing in aqueous alkali solution an organo-trihalosilane having an organic substituent corresponding with the substituent desired in the product. The organotrihalosilane may be conveniently prepared from the corresponding organic halide and silicon tetrachloride by utilizing the well-known Grignard reaction. In general, the hydrolysis reaction may be carried out by preparing an aqueous solution of an alkali and adding the organotrihalosilane in solution in a suitable solvent to the aqueous alkali with vigorous stirring. The hydrolysis proceeds easily and rapidly to give an aqueous solution of the desired product. In general the hydrolyzing solution should contain at least six equivalents of alkali per mol of trihalosilane.

The concentration of caustic alkali in the hydrolyzing solution may vary from about 5% to about 35% by weight, although in particular cases the hydrolysis may be effected with caustic alkali solutions more dilute than 5% and more concentrated than 35%.

In order to point out more fully the nature of the present invention, the following specific examples are given to illustrate certain compounds falling within the scope of the invention and the manner in which they may be prepared. It is to be understood that the following examples are illustrative only and it will be apparent to those skilled in the art that numerous other compounds may be prepared and that the illustrative methods described may be modified in various ways to adapt the methods and compounds to particular uses.

*Example 1.*—An aqueous solution of sodium hydroxide was prepared by dissolving 47.1 grams of sodium hydroxide in 267 cc. of water. To this sodium hydroxide solution a solution of 15 grams of methylphenyl trichlorosilane in 100 cc. of petroleum ether having a boiling point of 30° C. to 65° C. was added. The sodium hydroxide solution was agitated during the addition of methylphenyl trichlorosilane solution, and the methylphenyl trichlorosilane solution was added over a period of approximately five minutes. The resulting mixture was agitated for a period of about ¾ an hour to produce the sodium salts of the methylphenyl trichlorosilane hydrolysis products, and it was noted that considerable foam developed during this agitation. The petroleum ether evaporated off during the agitation period. When the agitation was stopped the foam subsided and it was noted that a small amount of insoluble material had been formed. This insoluble material was removed by filtration and the filtered solution analyzed.

Analysis showed that the solution contained about 2.3% by weight of sodium methylphenyl compounds. The surface tension of the solution was 37 dynes per centimeter as compared to 65 dynes per centimeter for a caustic soda solution of the same NaOH content.

*Example 2.*—A solution of 20 grams of ethylphenyl trichlorosilane in anhydrous ethyl ether was added to a solution of 166 grams of caustic soda in 1494 cc. of water during a period of about five minutes with vigorous stirring. The mixture was stirred for about four hours and appeared turbid due to a suspension of oil. The solution was filtered to remove a small amount of gelatinous precipitate.

Analysis indicated that the solution contained about 1.4% of the sodium ethylphenyl compounds. The surface tension of the solution was 34 dynes per centimeter as compared to 51 dynes per centimeter for a caustic soda solution of the same NaOH content, and thus the surface tension of the solution was lowered appreciably by the presence of the sodium ethylphenyl compounds. A solution containing 1% of the sodium ethylphenyl compounds and 14% NaOH wet out cotton skeins in ten minutes by the Draves test as compared to 69 minutes for a 14% NaOH solution alone.

*Example 3.*—A solution of 15 grams of isopropylphenyl trichlorosilane in 100 cc. of petroleum ether was prepared and added to a caustic soda solution made by dissolving 40 grams of sodium hydroxide in 236 cc. of water. The isopropylphenyl trichlorosilane solution was added to the caustic soda solution over a period of five minutes with stirring and the resulting mixture agitated for three hours during which time the petroleum ether evaporated and foam developed.

It was observed that a small amount of insoluble material was formed and this insoluble material was removed by filtration and the solution analyzed. Analysis showed that the solution contained about 1.4% by weight of the sodium isopropylphenyl compounds and the surface tension of the solution was 41 dynes per centimeter as compared to 67 dynes per centimeter for a sodium hydroxide of the same NaOH content.

*Example 4.*—A solution of 15 grams of di-isopropylphenyl trichlorosilane in 100 cc. of petroleum ether was prepared and added to a caustic soda solution made by dissolving 35.4 grams of sodium hydroxide in 200 cc. of water. The di-isopropylphenyl trichlorosilane solution was added to the sodium hydroxide solution over a period of five minutes with stirring. The resulting mixture was allowed to stand for a period of eight days with intermittent stirring, then diluted with 50 cc. of water and filtered.

Analysis of the filtered solution showed that it contained about 1% of the sodium di-isopropylphenyl compounds and the surface tension of the solution was 33 dynes per centimeter as compared to 52 dynes per centimeter for a caustic soda solution of the same NaOH content.

*Example 5.*—A solution of 15 grams of butylphenyl trichlorosilane in 100 cc. of petroleum ether was prepared and added to a caustic soda solution made by dissolving 39.7 grams of sodium hydroxide in 225 cc. of water. The two solutions were mixed over a period of five minutes with stirring. After addition of the butylphenyl trichlorosilane solution had been completed, the mixture was stirred for one hour during which time considerable foam developed and the mixture was then allowed to stand for several days and filtered.

Analysis of the filtered solution showed that it contained about 2.8% of the soluble sodium butylphenyl compounds. The surface tension of the solution was 42 dynes per centimeter as compared to 70 dynes per centimeter for a sodium hydroxide solution of the same NaOH content.

*Example 6.*—Fifteen grams of amylphenyl trichlorosilane in 100 cc. of ligroin were added dropwise with stirring to a caustic potash solution comprising 117 grams of KOH in 234 cc. of water. The hydrolysis reaction evolved considerable heat causing about half of the ligroin to be distilled off. The reaction mixture was steam distilled for about five hours to remove the remainder of the ligroin and a considerable amount of foam was produced during this period. A quantity of a white precipitate was formed which was filtered off and the filtered solution was analyzed.

Analysis showed that the solution contained about 2.1% of the potassium amylphenyl compound. The mol ratio of potassium to silicon was 1.0:1, indicating that the product was a cyclic polymer. The surface tension of a solution containing 1% of the potassium amylphenyl compound together with 9% potassium hydroxide was about 45 dynes per centimeter as compared to 58 dynes per centimeter for a potassium hydroxide solution of the same KOH content, thus indicating that the potassium amylphenyl compound reduced the surface tension of the solution appreciably.

Example 7.—A solution of 15 grams of diamylphenyl trichlorosilane in 100 cc. of petroleum ether was added to a caustic soda solution made by dissolving 30 grams of sodium hydroxide in 185 cc. of water. The diamylphenyl trichlorosilane solution was added to the sodium hydroxide solution over a period of three minutes with agitation. It was observed that the viscosity of the solution increased in the course of the hydrolysis reaction. After completion of the reaction the solution was filtered and the resulting filtered solution had a surface tension of 47 dynes per centimeter.

Example 8.—A solution of 18.9 grams of amylnaphthyl trichlorosilane in 100 cc. of dry ethyl ether was prepared and added to a solution of caustic soda made by dissolving 150 grams of sodium hydroxide in 850 cc. of water. The amylnaphthyl trichlorosilane solution was added to the sodium hydroxide solution over a period of five minutes with agitation, and the agitation continued for about four hours thereafter. The resulting product was allowed to stand over night, then agitated a few more hours and filtered.

Analysis of the filtered product showed that it contained 0.6% of the sodium amylnaphthyl compounds and the surface tension of the solution was 34 dynes per centimeter as compared to 52 dynes per centimeter for a sodium hydroxide solution of the same NaOH content.

Example 9.—A solution of 15 grams of tetrahydronaphthyl trichlorosilane in 100 cc. of ethyl ether anhydrous was added to a solution of 75 grams of sodium hydroxide in 425 cc. of water during five minutes with vigorous stirring. Appreciable foam developed during a period of three hours of stirring.

Analysis indicated that the solution contained about 2% of the sodium tetrahydronaphthyl compounds and the Na:Si mol ratio indicated that the sodium tetrahydronaphthyl compound was substantially all present in the monomeric form. The surface tension of the solution was 46 dynes per centimeter as compared to 59 dynes per centimeter for a caustic soda solution of the same NaOH content. The Draves test indicated that cotton yarn was wet out more rapidly by caustic soda solution if 1% of the organosilicon compound was present.

Example 10.—A solution of 6.1 grams of benzyl trichlorosilane in ligroin was added to a potassium hydroxide solution comprising 40.8 grams of KOH in 200 cc. of water. The reaction mixture was heated and stirred for a period of about 30 minutes and the ligroin then removed by steam distillation over a period of about 25 minutes. Foaming occurred towards the end of the distillation. The surface tension of the resulting solution diluted to 10% total solids was 41 dynes per centimeter as compared with a surface tension of about 59 dynes per centimeter for a potassium hydroxide solution of the same KOH content.

Example 11.—A solution of 15 grams of methylbenzyl trichlorosilane in 200 cc. of petroleum ether was added to a caustic soda solution containing 25 grams of sodium hydroxide in 227 cc. of water. The methylbenzyl trichlorosilane solution was added to the sodium hydroxide solution over a period of 30 minutes with vigorous agitation. Thereafter the mixture was stirred for four hours, allowed to stand over night and filtered.

Analysis of the filtered solution showed that it contained about 7.5% of the sodium methylbenzyl compounds and the surface tension of the solution was 37.7 dynes per centimeter as compared to 52.5 dynes per centimeter for a sodium hydroxide solution of the same NaOH content.

Example 12.—A solution of 15 grams of ethylbenzyl trichlorosilane in 100 cc. of petroleum ether was prepared and added to a solution of caustic soda made by dissolving 40 grams of sodium hydroxide in 226 cc. of water. Mixing of the solutions was effected over a period of 30 minutes with agitation. The resulting foamy solution was stirred for several hours, allowed to stand three days and filtered.

Analysis of the filtered solution showed that it contained about 1.8% of the sodium ethylbenzyl compounds and the surface tension of the solution was 36.5 dynes per centimeter as compared to 52.5 dynes per centimeter for a sodium hydroxide solution of the same NaOH content.

Example 13.—A solution of 15 grams of diethylbenzyl trichlorosilane in 200 cc. of petroleum ether was prepared and added to a caustic soda solution made by dissolving 17 grams of sodium hydroxide in 154 cc. of water. Mixing of the two solutions was effected over a period of five minutes with vigorous agitation. The resulting mixture was stirred for three hours and after standing over night was filtered.

Analysis of the filtered solution indicated the presence of about 1% of the sodium diethylbenzyl compounds and the surface tension of the solution was 34 dynes per centimeter as compared to 52.5 dynes per centimeter for a sodium hydroxide solution of the same NaOH content.

Example 14.—A solution of 15 grams of amylbenzyl trichlorosilane in 100 cc. of petroleum ether was hydrolyzed with a solution comprising 62.3 grams of KOH dissolved in 478 cc. of water. The procedure of Example 1 was followed and the product solution analyzed.

The anaylsis showed that the solution contained about 2.8% of the potassium amylbenzyl compounds and the mol ratio of potassium to silicon indicated that the potassium amylbenzyl compound was present in the form of polymeric chains having some cross-linking. The surface tension of the solution was 40 dynes per centimeter as compared to 59 dynes per centimeter for a potassium hydroxide solution of the same KOH content, and thus the potassium amylbenzyl compound reduced the surface tension of the solution appreciably. A solution containing 1% of the potassium amylbenzyl compound and 20% potassium hydroxide wet out cotton skeins in seven minutes by the Draves test.

Example 15.—A solution of 15 grams of isopropyl-phenyl-ethyl trichlorosilane

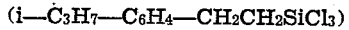
(i—C3H7—C6H4—CH2CH2SiCl3)

in 200 cc. of petroleum ether was prepared and added to a caustic soda solution made by dissolving 21.4 grams of sodium hydroxide in 193 cc. of water. Mixing was effected over a period of 20 minutes with agitation and the agitation continued for several hours. The solution was permitted to stand over night and filtered.

Analysis of the filtered solution showed the presence of about 1% of the sodium isopropylphenyl-ethyl compounds and the filtered solution had a surface tension of 28.5 dynes per centimeter as compared to 52 dynes per centimeter for a sodium hydroxide solution of the same NaOH content. The mol ratio of sodium to silicon in this product indicated that the product was a mixture of the monomer and dimer.

The foregoing examples illustrate methods of preparing salts of the mono-organosilanetriols and mono-organosiloxanols in aqueous solution. As indicated above it is also possible to prepare these salts in solid form and the following examples illustrate methods of preparing the solid salts.

*Example 16.*—A flask was charged with five grams of phenyl trichlorosilane and about 150 cc. of concentrated ammonium hydroxide was added slowly. White fumes of ammonium chloride were given off and a white precipitate was formed. The excess ammonium hydroxide solution was removed by decantation and the remaining precipitate dissolved in about 50 cc. of ethyl ether. 6.5 grams of solid KOH was then added to the ether solution with vigorous shaking, ammonia and ether fumes were given off and a white precipitate formed. Ether was decanted from the white precipitate which was then dried in vacuo and recrystallized from ethyl alcohol. Analysis of the crystals showed a mol ratio of potassium to silicon of about 1.4 to 1, indicating that the product was a mixture of polymers having an average size of five silicon units. The potassium phenyl compound was soluble in dilute alkaline solutions and lowered the surface tension of them.

*Example 17.*—A flask was charged with 56.3 grams of benzyl trichlorosilane and 150 cc. of concentrated ammonium hydroxide was added slowly. The reaction proceeded with considerable violence, fumes of ammonium chloride were given off, and a white precipitate was formed. Excess ammonium hydroxide solution was removed by decantation and the precipitate dissolved in 200 cc. of ethyl ether. 56.1 grams of solid caustic potash was then added to the ether solution with vigorous shaking and a white precipitate was formed and ammonia fumes were given off. The precipitate was recrystallized from ethyl alcohol several times and yielded clear transparent needle-like crystals. Analysis of the crystals showed a mol ratio of potassium to silicon of about 2.4:1, thus indicating that the product was a mixture of the monomer and dimer.

The crystals were water-soluble aand when dissolved in dilute caustic potash solution reduced the surface tension of the resulting solution.

*Example 18.*—A reaction flask was charged with approximately 200 cc. of liquid ammonia. A solution of 15 grams of amylphenyl trichlorosilane in 100 cc. of anhydrous ether was added dropwise to the liquid ammonia and heavy ammonium chloride fumes were given off as the reaction proceeded. When the addition of the amylphenyl trichlorosilane was complete, a solution of 8.9 grams of potassium hydroxide in 50 cc. of anhydrous ethyl alcohol was added and the mixture agitated and allowed to stand for seven days. An additional 10 grams of potassium hydroxide dissolved in 50 cc. of anhydrous ethyl alcohol was then added and the mixture filtered. The resulting alcoholic solution was set in a desiccator for a period of thirty days during which time about 10 grams of crystals were formed which were washed and dried.

It was found that these crystals were soluble in dilute caustic potash solution and that they reduced the surface tension of a 5% KOH solution from 60 to 31 dynes per centimeter when present to the extent of about 1% by weight in the solution. The mol ratio of potassium to silicon in this crystalline product was about 2.1:1, thus indicating that the compound was present in both polymeric and monomeric form.

*Example 19.*—A solution of 104.7 grams of potassium acetate in 340 cc. glacial acetic acid was added to 50 grams of amylphenyl trichlorosilane and an oily layer formed. The mixture was refluxed for about four hours and after it had stood several days an oil layer was separated which comprised amylphenyl silane-triol triacetate. This silanetriol triester was saponified by refluxing for about eight hours with a solution of 59.8 grams KOH in 150 cc. anhydrous ethyl alcohol. The solution was placed in a desiccator where crystallization took place slowly during a period of three weeks. The crystals were separated and analysis gave a mol ratio of potassium to silicon of 2.6:1 indicating that the potassium amylphenyl compound was present as a mixture of monomer and dimer. The crystals were soluble in dilute KOH solution and produced a foam.

*Example 20.*—5.63 grams of amylphenyl trichlorosilane was added dropwise with stirring to a solution of 6.5 grams of KOH in 50 cc. of anhydrous ethyl alcohol. The solution was decanted from the precipitate of KCl and placed in a desiccator for about a month, and the crystals which formed were then separated by filtration and washed with ethyl alcohol and ether. Analysis indicated that crystals of the potassium amylphenyl compound were formed which were a mixture of monomer and dimer. The crystals were soluble in dilute KOH solution and produced foam.

From the experiments that form the basis of the foregoing examples and also from other experiments that I have performed, it is possible to make certain general statements concerning the properties and characteristics of the products of the present invention. It appears that all of these products, when incorporated in aqueous solutions of alkali, cause the surface tensions of the solutions to be reduced below the surface tension values exhibited by caustic solutions of equivalent caustic concentration which do not contain the compounds. The reduction in surface tension varies somewhat with the type of organic substituent in the product.

From the foregoing description it is apparent that the present invention provides a novel group of organosilicon products that are water and alkali-soluble and are capable of reducing the surface tension of aqueous solutions. They have wetting and detergent properties and can be precipitated from alkaline solution by reduction of the alkalinity of the solution, e. g. by diluting or acidifying the solution, to form silicone polymers. Thus the solutions may be used as a medium for forming silicones in difficultly accessible locations, as for example, in the capillaries of and the interstices between the fibers of a fabric. Other applications of the present compounds and their aqueous and alkaline solutions will be apparent to those skilled in the art.

Since many embodiments might be made of the present invention and since many changes might be made in the embodiment disclosed herein, it is to be understood that the foregoing description is to be interpreted as illustrative only and not in a limiting sense.

I claim:

1. The method of making a surface active organo-silicon-containing reagent adapted to be used in the preparation of organo-silicon coatings which comprises causing an organo-trihalosilane, wherein the organo radical is selected from the group consisting of aryl, alkaryl, aralkyl and alkylaralkyl, to react with an aqueous solution of an alkali metal hydroxide containing at least six equivalents of said hydroxide per mol of trihalosilane to form a water-soluble hydrolysis product of said trihalosilane.

2. The method of making a surface active organo-silicon-containing reagent adapted to be used in the preparation of organo-silicon coatings which comprises causing an alkaryl trihalosilane to react with an aqueous solution of an alkali metal hydroxide containing at least six equivalents of said hydroxide per mol of trihalosilane to form a water-soluble hydrolysis product of said trihalosilane.

3. The method of making a surface active organo-silicon-containing reagent adapted to be used in the preparation of organo-silicon coatings which comprises causing ethylphenyl-trichlorosilane to react with an aqueous solution of an alkali metal hydroxide containing at least six equivalents of said hydroxide per mol of trichlorosilane to form a water-soluble hydrolysis product of said trichlorosilane.

4. The method of making a surface active organo-silicon-containing reagent adapted to be used in the preparation of organo-silicon coatings which comprises causing isopropylphenyl-trichlorosilane to react with an aqueous solution of an alkali metal hydroxide containing at least six equivalents of said hydroxide per mol of trichlorosilane to form a water-soluble hydrolysis product of said trichlorosilane.

5. The method of making a surface active organo-silicon-containing reagent adapted to be used in the preparation of organo-silicon coatings which comprises causing butylphenyl-trichlorosilane to react with an aqueous solution of an alkali metal hydroxide containing at least six equivalents of said hydroxide per mol of trichlorosilane to form a water-soluble hydrolysis product of said trichlorosilane.

6. The method of making a surface active organo-silicon-containing reagent adapted to be used in the preparation of organo-silicon coatings which comprises causing amylphenyl-trichlorosilane to react with an aqueous solution of an alkali metal hydroxide containing at least six equivalents of said hydroxide per mol of trichlorosilane to form a water-soluble hydrolysis product of said trichlorosilane.

7. The method of making a surface active organo-silicon-containing reagent adapted to be used in the preparation of organo-silicon coatings which comprises causing di-isopropylphenyl-trichlorosilane to react with an aqueous solution of an alkali metal hydroxide containing at least six equivalents of said hydroxide per mol of trichlorosilane to form a water-soluble hydrolysis product of said trichlorosilane.

CLINTON W. MacMULLEN.

REFERENCES CITED

The following references are of record in the file of this patent:

UNITED STATES PATENTS

| Number | Name | Date |
| --- | --- | --- |
| 2,432,891 | Hervey | Dec. 16, 1947 |
| 2,438,055 | Hyde | Mar. 16, 1948 |
| 2,441,422 | Krieble et al | May 11, 1948 |
| 2,441,423 | Elliot et al. | May 11, 1948 |

OTHER REFERENCES

Meads et al., Jour. Chem. Soc. (London), vol. 107 (1915), pages 459–68.

Meads et al., Jour. Chem. Soc. (London), vol. 105 (1914), pages 679–690.